United States Patent [19]

Ziv

[11] 4,113,201
[45] Sep. 12, 1978

[54] EXTENDED LOW TENSION RANGE DUAL TENSION SAFETY BELT RETRACTOR

[75] Inventor: Avraham Ziv, Sepulveda, Calif.

[73] Assignee: American Safety Equipment Corporation, Encino, Calif.

[21] Appl. No.: 791,477

[22] Filed: Apr. 27, 1977

[51] Int. Cl.$^2$ .................. A62B 35/02; B65H 75/48
[52] U.S. Cl. ............................ 242/107; 242/107.4 R
[58] Field of Search .................. 242/107, 107.4 R; 280/744–747; 297/388

[56] References Cited

U.S. PATENT DOCUMENTS

| | | | |
|---|---|---|---|
| 3,984,063 | 10/1976 | Knieriemen | 242/107 |
| 4,002,219 | 1/1977 | Steinmann | 242/107 X |
| 4,026,494 | 5/1977 | Tanaka | 242/107.4 R X |

Primary Examiner—Harvey C. Hornsby
Assistant Examiner—John M. Jillions
Attorney, Agent, or Firm—Poms, Smith, Lande & Glenny

[57] ABSTRACT

A safety belt retractor has an extended low tension range dual tensioning and rewind means including a reel rewind spring means for biasing the reel in a belt rewind direction under the urging of a first bias, tension reducing means for providing a second rewind bias of a lower value on said reel than the first bias to provide a reduced tension on a safety belt, activating means for activating the tension reducing means in response to reel rotation in a predetermined manner and means for deactivating such tension reducing means in response to reel rotation under the urging of the second bias including the provison of a spiral cam surface mounted to the retractor frame and presenting a spiral surface having an extent of more than one whole revolution about a spiral center, a cam follower provided to be moved along the spiral surface, means for driving the cam follower along such cam surface in response to rotation of the reel and means operated by radial displacement of the cam follower relative to the spiral center due to travel of more than one full revolution of the follower about such center for deactivating the tension reducing means.

12 Claims, 9 Drawing Figures

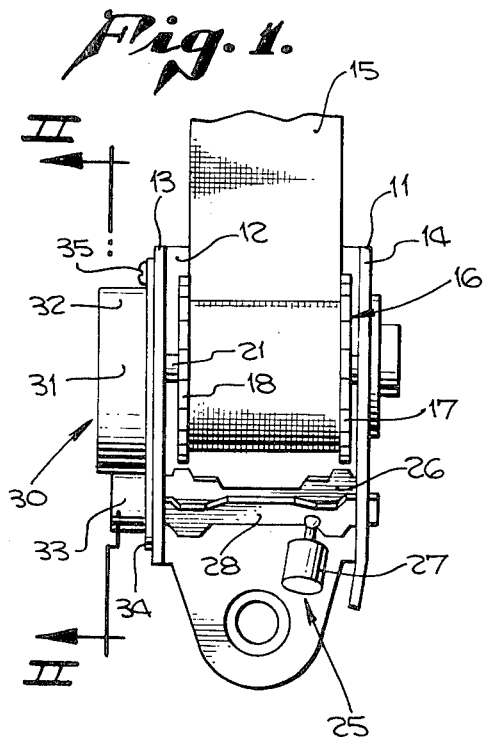
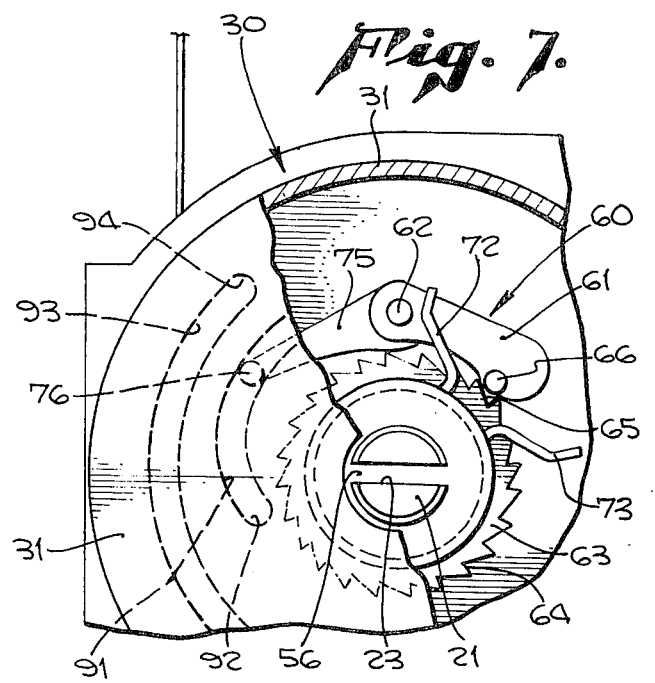
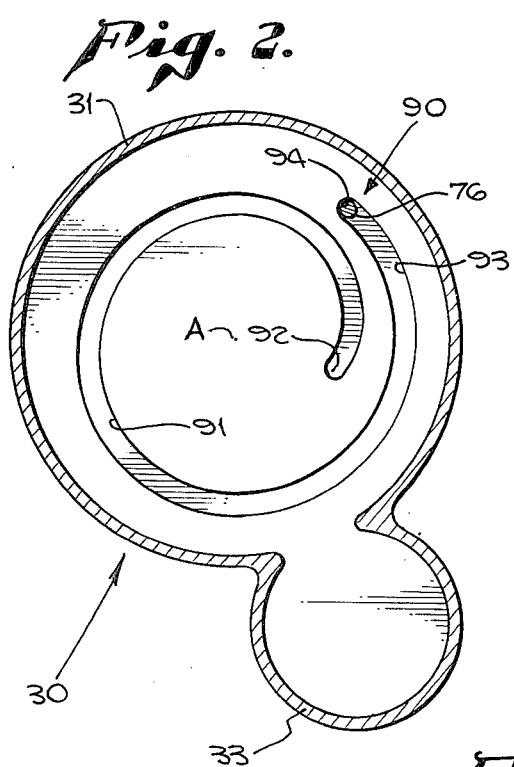
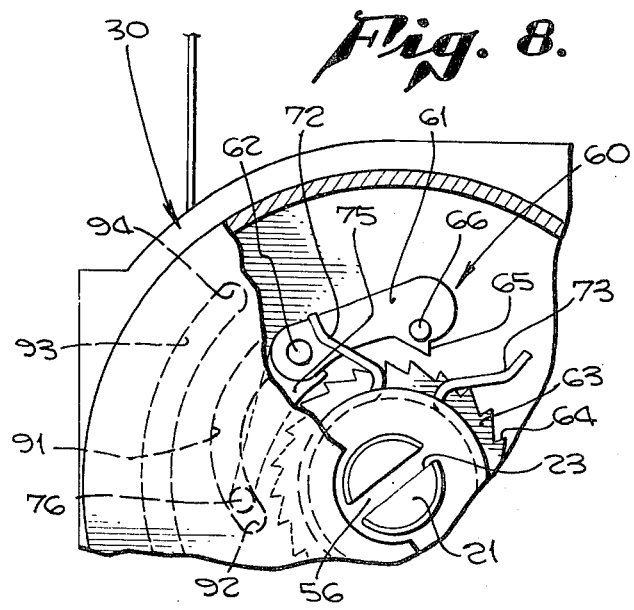
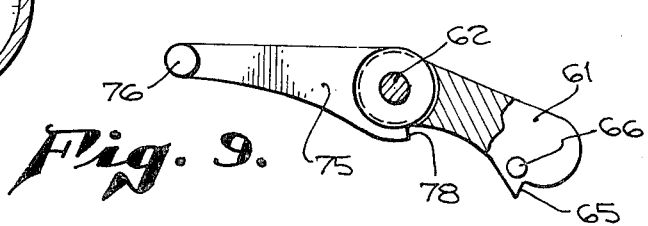

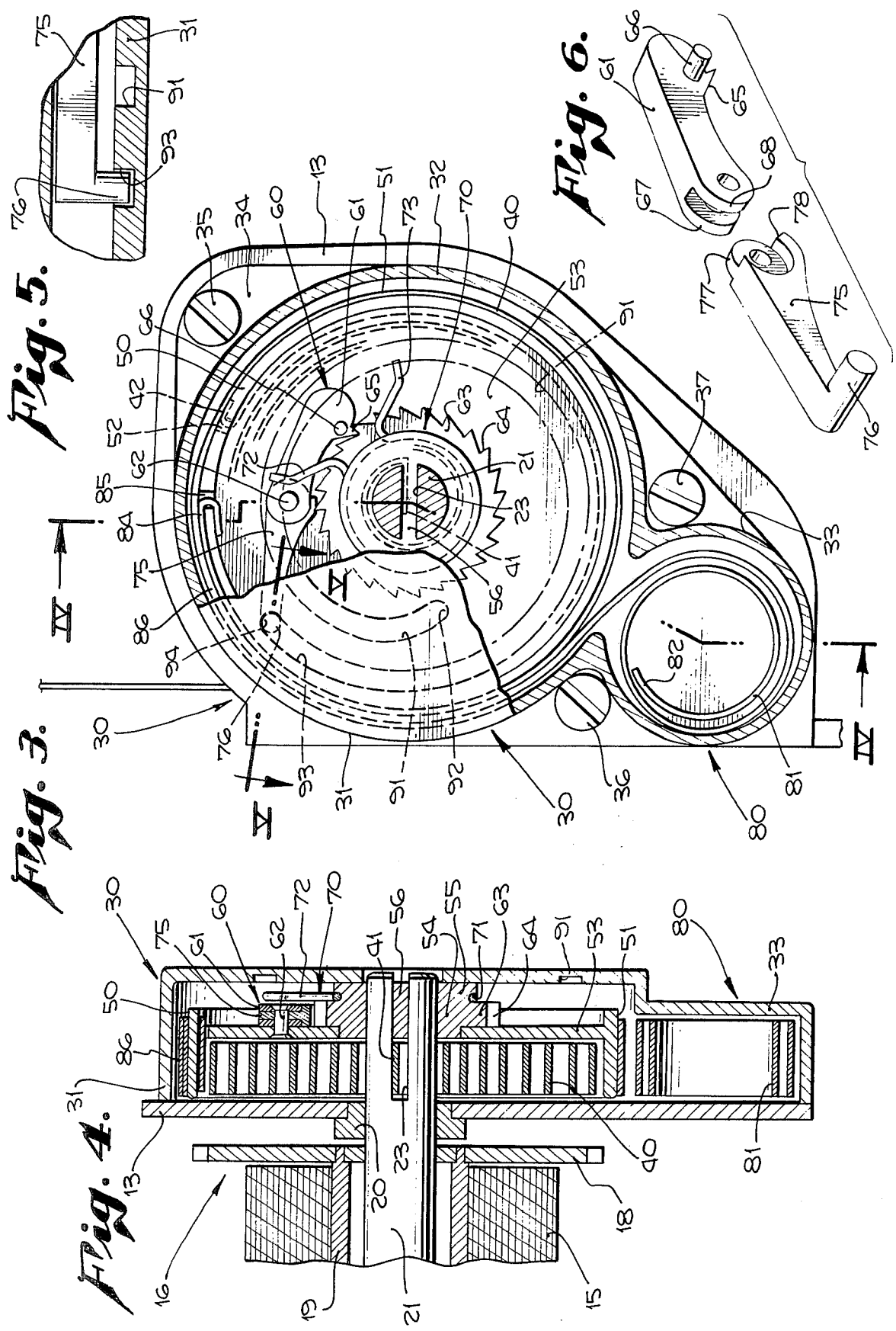

EXTENDED LOW TENSION RANGE DUAL TENSION SAFETY BELT RETRACTOR

BACKGROUND OF THE INVENTION

This invention relates in general to safety belt tensioning and rewinding means for safety belt retractors employed for storing safety belts or webbing of safety harnesses utilized in vehicles for restraining a passenger in his seat during emergency conditions. More specifically, the present invention relates to an improvement in means for providing an extended low tension range for a dual tension safety belt tensioning and rewind means. Safety belt retractors developed heretofore for use in storing and automatically locking safety belts of safety harnesses employed in vehicles have employed various means for providing a dual tension on the belt, a first tension for rewinding the belt onto the retractor and a second lower tension for maintaining the belt snug against the passenger when the belt is in use. The passenger is thus not subjected to the higher tension provided for rewinding the safety belt while the belt is in use. Exemplary of such prior dual tension safety belt retractors is that of United States Patent Application Ser. No. 751,753 filed Dec. 17, 1976 now U.S. Pat. No. 4,081,051 and entitled "Safety Belt Tensioning and Rewinding Retractor".

However, I have found that it is desirable to provide for a greater length of travel for the safety belt when in the low tension mode than was heretofore available in prior retractor constructions as in said prior application.

SUMMARY OF THE INVENTION

It is therefore a primary object of the present invention to disclose and provide an improvement in safety belt tensioning and rewind means wherein an extended low tension range is provided for the dual tensioning means compared to that available for prior dual tension retractors of the type mentioned herein before.

It is another object of the present invention to disclose and provide an improvement in extended low tension range dual tensioning and rewinding means for an emergency locking safety belt retractor wherein the selection of either of two rewinding biases applied to the reel are selectable to spool rotation of a predetermined manner and, specifically, wherein the reel may have a rotation of more than one full revolution in the belt winding direction under the urging of the lower tension or bias before the higher tension or rewind bias in rendered operable in order to extend the amount of belt movement available while the rewind means is in the low tension mode.

Generally stated, the present invention includes the provision of a spiral cam surface and a cam follower driven off of rotation of the reel when the reel is biased by the low tension rewind bias and movement of the follower along the surface in response to more than one rotation of the reel is utilized to place the tensioning and rewinding means in a higher tension rewinding mode.

More specifically, the present invention is provided in the environment of a safety belt retractor having a frame, a belt storage reel rotatably mounted to the frame, a reel rewind spring means for biasing the reel in a belt rewind direction under the urging of a first bias, tension reducing means for providing a second rewind bias on the reel of an amount less than the first bias to provide a reduced tension on the belt, activating means for activating the tension reducing means in response to reel rotation in a predetermined manner and means for deactivating the tension reducing means in response to reel rotation under the urging of the second bias wherein such deactivating means includes the provision of a spiral cam surface means mounted to the retractor frame and presenting a spiral surface having an extent of more than one full revolution about a spiral center, cam follower means mounted to the frame for movement along the surface, means for driving the cam follower along the surface in direct response to rotation of the reel and means operated by radial displacement of the follower relative the spiral center due to travel of more than one full revolution about the center for deactivating the tension reducing means.

A more complete understanding of the present invention as well as an appreciation of additional objects and advantages therefor will be afforded to those skilled in the art from a consideration of the following detailed description of a preferred exemplary embodiment thereof.

BRIEF DESCRIPTION OF THE DRAWINGS

FIG. 1 is a plan view of an exemplary emergency locking retractor employing the improvements in an extended low tension range dual tension safety belt retractor in accordance with the present invention;

FIG. 2 is a section view of the retractor of FIG. 1 taken along the plane II—II;

FIG. 3 is a side section view of the retractor of FIG. 1 showing the improvement in extended low tension range dual tensioning means of the present invention;

FIG. 4 is a cross-section view taken along the plane IV—IV in FIG. 3;

FIG. 5 is a detailed view, partially in section, taken along the plane V—V in FIG. 3;

FIG. 6 is a detailed view of portions of the dual tension means of FIGS. 3 and 4 shown in exploded relation;

FIG. 7 is a detailed view of the dual tension means of FIG. 3 showing the means in a low tension mode;

FIG. 8 is a detailed view as in FIG. 7 showing release of the dual tension means from the low tension mode of FIGS. 3 and 7; and FIG. 9 is a detailed view as FIG. 6 showing the illustrated parts in assembled relation.

DETAILED DESCRIPTION OF A PREFERRED EXEMPLARY EMBODIMENT:

An exemplary embodiment of emergency locking, inertia resposive, safety belt retractor is illustrated in FIG. 1. The retractor, indicated generally at 10, includes a generally U-shaped frame 11 having base 12 and side walls 13 and 14. A safety belt 15, which may be part of a safety harness or belt system as known in the industry, is wound upon the reel, indicated generally at 16, of the retractor as seen in FIGS. 1, 3 and 4. The reel includes a pair of spaced ratchet wheels at 17 and 18 fixed upon shaft 21 which in turn is mounted by bushings, at bushing 20, to the retractor frame side walls 13 and 14. Spool 19 is fixed to ratchet wheels 17 and 18 in conventional manner and mounts the belt 15 thereabout.

As is known prior to the invention of the present application, the safety belt retractor may be operated to a locked position in response to inertial forces sensed by the retractor. In the exemplary embodiment, such emergency locking means are illustrated generally at 25 and include the provision of a locking pawl bar 26 pivotally mounted between frame side walls 13 and 14 for engagement with the respective ratchet wheels 17 and 18 on tilting movement of bar 26. Bar 26 is tilted into locking engagement with the ratchet wheels 17 and 18 during an emergency condition by the pendulum-like inertia sensor mass 27 suspended from support bar 28 in a manner to place a head portion thereof beneath bar 26 in operative relation.

The present exemplary embodiment of safety belt retractor is further provided with dual tension producing means generally as described in prior U.S. Pat. No. 4,081,051 and entitled "Safety Belt Tensioning and Rewinding Retractor". The disclosure thereof is incorporated herein by this reference. However, for purposes of the present disclosure, it is noted that the exemplary dual tensioning and rewinding means is indicated generally at 30 in FIG. 1 and is provided within housing 31 which includes an upper generally cylindrical portion 32 and a lower, laterally displaced, smaller generally circular portion 33. As seen in FIGS. 3 and 4, housing 31 includes a base 34 by which it is mounted to side wall 13 and retained there by suitable fasteners, as screws 35, 36 and 37.

First biasing means for biasing the safety belt reel 16 towards a belt storage condition includes a main rewind coil spring 40 which has its inner end 41 connected to shaft 21, via slot 23, and its outer end 42, as seen in FIG. 3, connected to member 50. Member 50, as best seen in FIGS. 3 and 4, is rotatably mounted relative to shaft 21, is of drum-like configuration having cylindrical outer wall 51 and which is provided with slot 52 to receive the outer end 42 of spring 40. Drum member 50 is further provided with a cylindrical web 53 which has a central aperture mounting the web upon and rotatable relative to an inner bushing portion 54 of bushing 55 which is fixed via web 56 in non-rotatable relation to shaft 21. It can be seen from the foregoing that coil spring 40 normally biases member 50 in a clock-wise direction and shaft 21 in a counter-clock-wise, webbing rewind, direction in FIGS. 3, 4 and 5.

The dual tension means of the exemplary embodiment further includes means for releasably connecting member 50 to reel 16 to block the bias of rewind coil spring 40 and thus relieve belt 15 of the tension otherwise applied by spring 40. Such connecting means is indicated generally at 60 and includes pawl 61 mounted by pin 62 for pivotal movement on web 53 of member 60. A ratchet 63 of gear-like configuration is formed integrally of bushing 55 with teeth 64 facing in a counter-clock-wise direction in FIG. 3 for engagement by pawl tooth 65. When pawl 61 engages ratchet 63, as seen in FIG. 3, member 50 is connected thereby to shaft 21 and reel 16 in a manner preventing relative rotation due to the bias of spring 40.

The operation of pawl 61 between engagements and disengagements with ratchet 63 is in part controlled by a spring wire combination clutch and cam means 70 which has a circular body portion mounted in groove 71 of member 55 to provide a frictionally driven relation to cam means 70 in response to rotation of reel 16. Means 70 is further provided with cam arm portions 72 and 73, as seen in FIG. 3, for engaging cam follower pin 66 provided on pawl 61. During a normal unwinding operation of reel 16, arm 72 holds pawl 61 disengaged from ratchet 63, but on a slight rewinding movement of belt 15, as normally occurs during buckling up of a safety belt harness employing the safety belt 15, the reel will move in a rewind direction allowing pawl 61 to fall into engagement with ratchet 63. Arm 73 functions to hold pawl 61 released from ratchet 63 during relative rotation between member 50 and ratchet 63 following the end of a low tension mode as explained hereinafter.

The low tension mode for the retractor of the exemplary embodiment, when coil spring 40 is blocked out due to engagement of pawl 61 with ratchet 63, is provided by a second biasing means in the exemplary embodiment, such second means being indicated generally at 80 and including a constant torque coil spring 81 having its main body portion positioned loosely within the laterally disposed smaller houser portion 33 with an inner end 82 merely left free. An outer end 84 of spring 81 is secured to member 50 via slot 85 with outer end portions 86 of spring 81 encircling member 50 when member 50 is in the position as seen in FIGS. 3 and 4. The bias of second spring 81 is in a counter-clock-wise direction in FIG. 3, a direction opposite to the bias of first spring 40 on member 50. Thus, when main spring 40 is blocked out, a lower rewind bias is applied to reel 16 by the second spring 81 until pawl 61 is released from ratchet 63. The present improvement in means for deactivating the tension reducing means, including pawl 61, in response to reel rotation under the urging of the second spring 81 will now be explained.

As is particularly contemplated within the present invention, the range of reel rotation under the bias of the second low tension biasing of spring 81 is extended for more than one full reel rotation before the means for relieving the tension of the main rewind spring 40 is deactivated. In the exemplary embodiment, such means include the provision of spiral cam surface means, indicated generally at 90, formed on an inner surface of housing 31 and thereby mounted to frame 11. As best seen in FIG. 2, the exemplary spiral cam surface is provided by a spiral groove 91 having an extent of more than one full revolution about its spiral center located approximately at the point indicated by reference letter A. The spiral groove in the exmplary embodiment extends from an inner end 93 to an outwardly diverging spiral path including outer surface portions 93 spaced radially outwardly relative center A to an outer end 94.

The main spring tension relieving means, pawl 61 and ratchet 63 in the exemplary embodiment, are deactivated in accordance with the present invention through operation of cam actuated means for moving pawl 61 out of engagement with ratchet 63 after the reel has rotated in a rewind direction under the low tension of spring 81 of more than one full revolution. Referring to FIGS. 3 and 7, cam arm 75 is pivotally mounted to pin 62 and mounts a cam follower 76 for movement along surface 91. When pawl 61 engages ratchet 63, member 50, mounting pin 62, and the reel rotate in unison thus moving cam follower 76 under the driving action of arm 75 in unison with reel rotation in the low tension mode.

As best seen in FIG. 6, the exemplary pawl 61 is mounted to pin 62 via a bifurcate mounting end including flanges 67 and 68. Arm 75 is provided with a flange 77 sized to fit between flanges 67 and 68 so that all three flanges are pivotally mounted about pin 62 as seen in FIG. 9. Cam arm 75 is further provided with an abutment surface 78 which abuts an underside of pawl 61, as seen in FIG. 9, when arm 75 is pivoted about pin 62 relative to pawl 61 from the positions of FIGS. 3 and 7 to that of FIG. 8.

As can be seen from the foregoing, as reel 16 rotates counter-clock-wise in FIG. 3 under the urging of low tension spring 81, pawl follower 76 rides in the spiral groove along surface 93, moving radially inwardly as it progresses along the spiral groove as seen in FIG. 7 until it reaches the inner end of the spiral groove, as seen in FIG. 8, and raises pawl 61 out of engagement with ratchet 63 through the abutment of surface 78 with the underside of pawl 61. On release of pawl 61 from ratchet 63, main rewind spring 40 becomes operable to bias member 50 in the clock-wise direction and reel shaft 21 in the counter-clock-wise direction of FIG. 3, 7 and 8. Drum 50 thus rotates from the position of FIG. 8 back to that of FIG. 3 where it is held through engagement of cam follower 76 with the end 94 of the spiral groove 91. Rotation of member 50 in the clock-wise direction in FIG. 3 is thus limited by the travel of cam follower 76 in spiral groove 91.

From the foregoing, it can be seen that the disengagement of pawl 61 from ratchet 63, to reactivate the main spring 40 is controlled by the radial displacement of cam follower 76 from the position of FIG. 3 to that of FIG. 8 whereby arm 75 places its abutment surface 78 into engagement with and lifts the pawl out of engagement with ratchet 63. As should be apparent to those skilled in the art, the length of spiral groove 91 may be selected as desired to provide for an extended range of the low tension mode, when pawl 61 is in engagement with ratchet 63, for as many turns of reel 16 as is desired by providing a comparable number of turns for the spiral cam surface indicated generally at 90.

Having thus described a preferred exemplary embodiment of an extended low tension range dual sensitive rewind means for a safety belt retractor in accordance with the present invention, it should be apparent to those skilled in the art that various alternative embodiments, adaptations and modifications thereof can be made within the scope and spirit of the present invention which is defined by the following claims:

I claim:

1. In a safety belt retractor having a frame, a belt storage reel rotatably mounted to said frame, a rewind spring means for biasing said reel in a belt rewind direction under the urging of a first bias, tension reducing means for providing a second rewind bias on said reel of an amount less than said first bias to provide a reduced tension on said belt, activating means for activating said tension reducing means in response to reel rotation in a predetermined manner, the improvement in means for deactivating said tension reducing means in response to reel rotation under the urging of said second bias comprising the provision of:
spiral cam surface means mounted to said frame and presenting a spiral surface having an extent of more than one full revolution about a spiral center;
cam follower means mounted to said frame for movement along said surface;
means for driving said cam follower means along said surface in direct response to rotation of said reel; and
means operated by radial displacement of said cam follower means relative said spiral center due to travel of more than one full revolution about said center for deactivating said tension reducing means.

2. The improvement in safety belt retractor of claim 1 wherein said tension reducing means includes a pawl and ratchet, said pawl engaging said ratchet when in an activated position to provide said second rewind bias, and means for mounting said pawl for rotation concurrent with rotation of said reel when in said activated position due to the operation of said activating means and said reel is biased by said second rewind bias; and
said means operated by radial displacement of said cam follower means includes abutment means for engaging said pawl during its rotation with said reel and for moving said pawl to a deactivated position out of engagement with said ratchet when said cam follower means is radially displaced by a predetermined amount.

3. The improvement in safety belt retractor of claim 2 wherein said retractor includes a cover for said spring means and tension reducing means and said spiral surface is formed on an inner side of said cover.

4. The improvement in safety belt retractor of claim 1 wherein:
said means for mounting said pawl for rotation concurrent with rotation of said reel includes a member rotatably mounted to said retractor frame and a pivot pin pivotally mounting said pawl;
said means for driving said cam follower means includes an arm pivotally mounted to said pivot pin and mounting said follower for rotation relative said pin; and
said means operated by radial displacement of said follower includes an abutment surface on said arm and disposed for engaging and moving said pawl to a deactivated position on movement of said arm about said pin by said cam follower means.

5. The improvement in safety belt retractor of claim 4 wherein said member is biased by said rewind spring means in a first direction opposite to the direction of rotation thereof under said second reduced rewind bias; and
said spiral cam surface terminates at one end in a stop surface, whereby rotation of said member in said first direction is limited by said cam follower means abutting said stop surface.

6. In a safety belt retractor having a belt storage reel and rewind spring means for biasing said reel in a belt rewind direction, means for providing a reduced rewind bias on said reel to provide a reduced tension on said belt; means for activating said means for providing a reduced rewind bias in response to reel rotation in a predetermined manner; and means for deactivating said means for providing a reduced rewind bias in response to reel rotation in a belt rewind direction of more than one full revolution under the influence of said reduced tension, the improvement in said deactivating means comprising the provision of:
camming means including a spiral cam surface and a cam follower driven by rotation of said reel when biased by said reduced rewind bias along said surface, movement of said follower by said surface operating to deactivate said means for providing a reduced rewind bias.

7. The improvement in safety belt retractor of claim 6 wherein means are provided for mounting said follower for concurrent rotation of substantially the same amount as said reel and said spiral cam surface has an extent of greater than one revolution, whereby said reel may rotate more than one revolution under the influence of said reduced rewind bias before said means for providing a reduced rewind bias is deactivated.

8. In a safety belt tensioning and rewinding retractor having a safety belt storage reel rotatably mounted to a retractor frame and lockable against belt unwinding by emergency locking means;

a member rotatably mounted to said frame and means for limiting rotation of said member in a first rotative direction;

first spring means connected between said member and reel for biasing said member toward said limiting means and said reel in an opposite, belt rewinding direction;

tension relieving means for releasably connecting said member to said reel when activated to block the bias of said first spring means when said belt is placed in a position of use; and second spring means for biasing said member in a belt rewind direction whereby said reel, when connected to said member by said connecting means, is biased in a rewind direction by said second spring means wherein the bias of said second spring means on said member is of a lesser amount and is in an opposite direction to that of said first spring means acting on said member, the improvement comprising the provision of:

spiral cam surface means mounted to said frame and presenting a spiral surface having an extent of more than one full revolution about a spiral center;

cam follower means mounted to said frame for movement along said surface;

means for driving said cam follower along said surface in direct response to rotation of said spool; and means operated by radial displacement of said follower relative said spiral center due to travel of more than one full revolution about said center for deactivating said tension relieving means.

9. The improvement in safety belt retractor of claim 8 wherein said tension relieving means includes a pawl and ratchet, said pawl engaging said ratchet when in an activated position to provide said second rewind bias, and means for mounting said pawl for rotation concurrent with rotation of said spool when in an activated position due to the operation of said activating means and said spool is biased by said second rewind bias; and said means operated by radial displacement of said cam follower means includes abutment means for engaging said pawl during its rotation with said spool and for moving said pawl to a deactivated position out of engagement with said ratchet when said cam follower means is radially displaced by a predetermined amount.

10. The improvement in safety belt retractor of claim 9 wherein said retractor includes a cover for said first spring means and tension relieving means and said spiral surface is formed on an inner side of said cover.

11. The improvement in safety belt retractor of claim 10 wherein:

said means for mounting said pawl for rotation concurrent with rotation of said spool includes a member rotatably mounted to said retractor frame and a pivot pin pivotally mounting said pawl;

said means for driving said cam follower means includes an arm pivotally mounted to said pivot pin and mounting said follower for rotation relative said pins; and said means operated by radial displacement of said follower includes an abutment surface on said arm and disposed for engaging and moving said pawl to a deactivated position on movement of said arm about said pin by said cam follower means.

12. The improvement in safety belt retractor of claim 11 wherein said member is biased by said first spring means in a first direction opposite to the direction of rotation thereof under said second reduced rewind bias; and said spiral cam surface terminates at an outer end in a stop surface, whereby rotation of said member in said first direction is limited by said cam follower means abutting said stop surface.

* * * * *